US010363876B2

(12) United States Patent
Onaka

(10) Patent No.: US 10,363,876 B2
(45) Date of Patent: Jul. 30, 2019

(54) IMAGE DISPLAY DEVICE

(71) Applicant: HONDA MOTOR CO., LTD., Tokyo (JP)

(72) Inventor: Junichiro Onaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 152 days.

(21) Appl. No.: 15/487,762

(22) Filed: Apr. 14, 2017

(65) Prior Publication Data

US 2017/0297496 A1 Oct. 19, 2017

(30) Foreign Application Priority Data

Apr. 15, 2016 (JP) .................................. 2016-081949

(51) Int. Cl.
*H04N 7/18* (2006.01)
*B60R 1/12* (2006.01)
(Continued)

(52) U.S. Cl.
CPC ................ *B60R 1/12* (2013.01); *B60K 35/00* (2013.01); *H04N 5/23293* (2013.01); *H04N 5/44591* (2013.01); *H04N 7/181* (2013.01); *B60K 2370/143* (2019.05); *B60K 2370/152* (2019.05); *B60K 2370/173* (2019.05); *B60K 2370/176* (2019.05); *B60K 2370/1868* (2019.05); *B60K 2370/193* (2019.05); *B60K 2370/21* (2019.05); *B60K 2370/52* (2019.05); *B60K 2370/777* (2019.05); *B60R 2001/1253* (2013.01); *B60R 2300/105* (2013.01); *B60R 2300/303* (2013.01); *B60R 2300/404* (2013.01); *B60R 2300/804* (2013.01); *B60R 2300/8006* (2013.01);
(Continued)

(58) Field of Classification Search
CPC .................. B60R 2300/602; B60R 2300/8093
USPC ........................................................ 348/148
See application file for complete search history.

(56) References Cited

U.S. PATENT DOCUMENTS

2006/0012715 A1* 1/2006 Abe ........................ H04N 5/144
348/584
2011/0115615 A1* 5/2011 Luo ............................ B60R 1/00
340/436
(Continued)

FOREIGN PATENT DOCUMENTS

JP 2013-216286 A 10/2013
JP 2014-204132 A 10/2014

OTHER PUBLICATIONS

Office Action dated Mar. 27, 2018, issued in counterpart Japanese Application No. 2016-081949, with English translation (11 pages).

*Primary Examiner* — Tat C Chio
*Assistant Examiner* — Fabio S Lima
(74) *Attorney, Agent, or Firm* — Westerman, Hattori, Daniels & Adrian, LLP

(57) ABSTRACT

An image control unit of an image display device provides, on display screens of a display unit, a captured-image-only region in which only a captured image is displayed when the display unit displays the captured image, and multiple-image regions in which the captured image or a different image that is different from the captured image is selectively displayed when the display unit displays the captured image. In an embodiment, the image control unit fixes a position of the captured-image-only region on the display screens.

4 Claims, 9 Drawing Sheets

(51) Int. Cl.
*H04N 5/232* (2006.01)
*H04N 5/445* (2011.01)
*B60K 35/00* (2006.01)
*G06K 9/00* (2006.01)

(52) U.S. Cl.
CPC ............. *B60R 2300/8033* (2013.01); *B60R 2300/8066* (2013.01); *B60R 2300/8093* (2013.01); *G06K 9/00335* (2013.01); *G06K 9/00798* (2013.01); *G06K 9/00805* (2013.01); *G06K 9/00845* (2013.01)

(56) References Cited

U.S. PATENT DOCUMENTS

| | | | |
|---|---|---|---|
| 2014/0114534 A1* | 4/2014 | Zhang | B60R 1/00 701/42 |
| 2014/0198214 A1* | 7/2014 | Maruoka | B62D 15/0295 348/148 |
| 2014/0347489 A1* | 11/2014 | Kumon | B60R 1/00 348/148 |
| 2017/0282813 A1* | 10/2017 | Hashimoto | B60R 1/00 |
| 2018/0065558 A1* | 3/2018 | Matsuyama | B60R 1/12 |

* cited by examiner 100, 100a 102, 102a

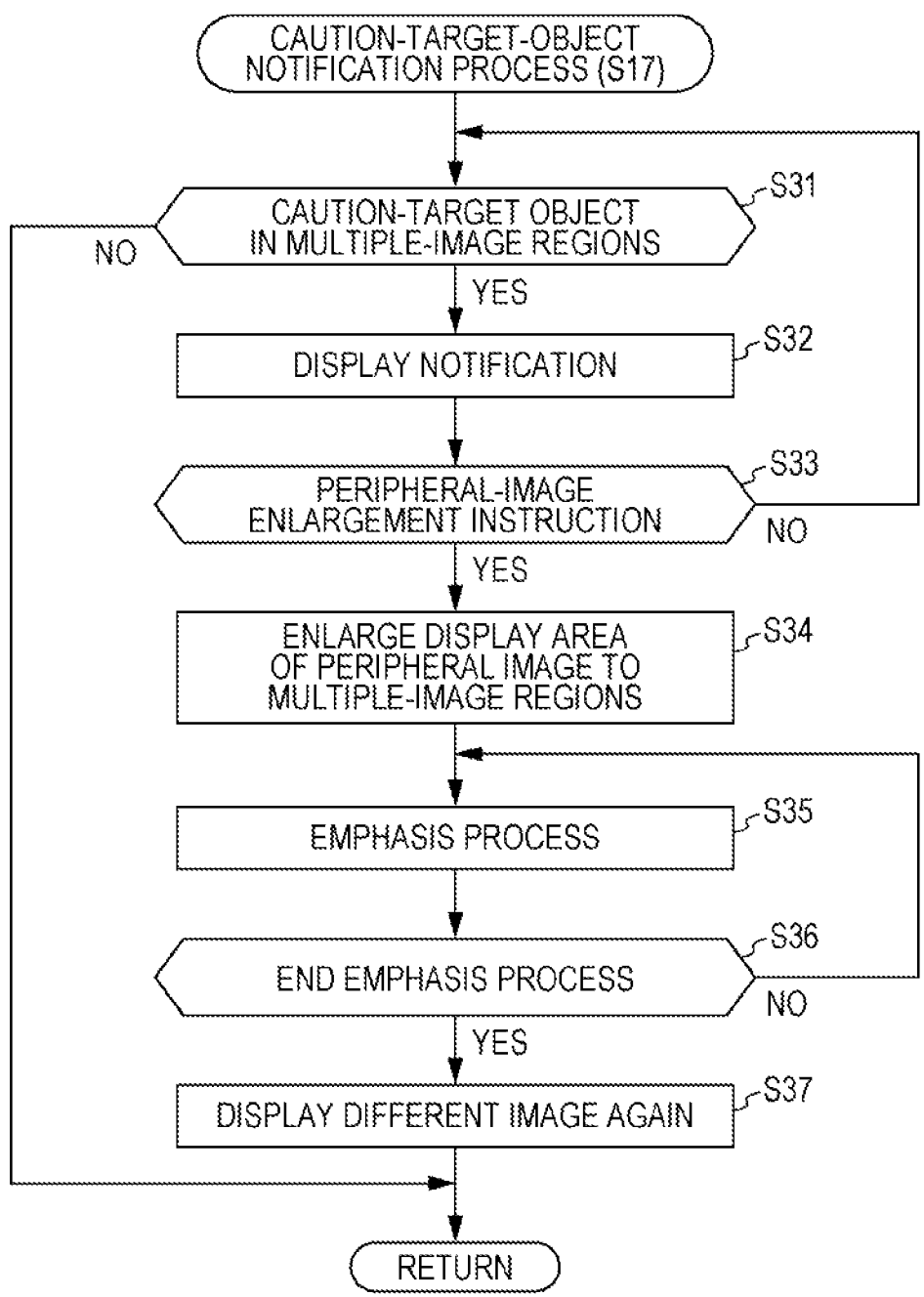

IMAGE DISPLAY DEVICE

CROSS REFERENCES TO RELATED APPLICATIONS

The present application claims priority under 35 U.S.C. § 119 to Japanese Patent Application No. 2016-081949, filed Apr. 15, 2016, entitled "Image Display Device." The contents of this application are incorporated herein by reference in their entirety.

BACKGROUND

1. Field

The present disclosure relates to image display devices that display images captured by cameras.

2. Description of the Related Art

Japanese Unexamined Patent Application Publication No. 2013-216286 provides a monitoring device for checking vehicle surroundings, the monitoring device giving an impression similar to that of a rear-view mirror ([0007], Abstract). Accordingly, Japanese Unexamined Patent Application Publication No. 2013-216286 (Abstract) provides an image processor 14 that processes an input image Vo that has been captured by a rear-view camera 11 that captures images of the region behind a vehicle, an image display 12 that displays output images Va and Vb that have been processed, and an orientation detector 13 that detects the relative positions of the head of a driver D (Da, Db). The image processor 14 can perform a process in which, on the basis of the relative positions of the driver's head detected by the orientation detector 13, parts of the entire capture area of the input image Vo are extracted as the output images Va and Vb. In addition, the image processor 14 can perform a process in which, in accordance with the displacement of the relative position of the driver's head detected by the orientation detector 13, the extracted areas (Va, Vb) of the input image Vo are moved in the direction opposite to the displacement direction.

As described above, Japanese Unexamined Patent Application Publication No. 2013-216286 (Abstract) discloses that an image (peripheral image) captured by a camera is displayed on the image display 12 (electronic rear-view mirror) instead of a traditional rear-view mirror. In Japanese Unexamined Patent Application Publication No. 2013-216286, however, displaying a different image, which is not captured by the camera, on the image display 12 simultaneously with the image captured by the camera is not considered. This technique is not considered either for a display device other than the rear-view mirror.

SUMMARY

The present application has been made in view of the above issues and describes an image display device that can increase user convenience if a captured image, such as an image of the periphery of a vehicle, and a different image are simultaneously displayed.

An image display device according to an embodiment of the present disclosure includes an image control unit (or an image controller) that causes a display unit (or a display) to display an image captured by a camera. The image control unit provides, on a display screen of the display unit, a captured-image-only region in which only the captured image is displayed when the display unit displays the captured image and a multiple-image region in which the captured image or a different image that is different from the captured image is selectively displayed when the display unit displays the captured image. In addition, the image control unit fixes a position of the captured-image-only region on the display screen.

According to the embodiment of the present disclosure, the multiple-image region is provided in addition to the captured-image-only region. Accordingly, by displaying the different image simultaneously with the captured image, such as an image of the periphery of a vehicle, it is possible to increase user convenience regarding the use of the captured image.

In addition, according to the embodiment of the present disclosure, the position of the captured-image-only region on the display screen is fixed. Accordingly, even if the displaying of the different image is started or ended, the position of the captured-image-only region on the display screen does not change. Therefore, it is possible to reduce the feeling of strangeness or cognitive load that the user has if the display area of the captured image is changed in response to starting or ending displaying the different image. Thus, user convenience can be increased if the captured image, such as the image of the periphery of the vehicle, and the different image are simultaneously displayed.

When causing the different image to be displayed in the multiple-image region in a state where the captured image is displayed in the multiple-image region, the image control unit may fix the position of the captured-image-only region on the display screen and may cause the different image to fade in while decreasing a display area of the captured image in the multiple-image region. In addition, when ending displaying the different image in a state where the different image is displayed in the multiple-image region, the image control unit may fix the position of the captured-image-only region on the display screen and may cause the different image to fade out from the multiple-image region while increasing the display area of the captured image.

Accordingly, the user can easily understand, by intuition, switching between the captured image and the different image in the multiple-image region. In addition, even if the captured image and the different image are switched in the multiple-image region, since the position of the peripheral-image-only region is fixed, it is possible to reduce the user's feeling of strangeness or cognitive load.

If a caution-target object is present within the captured image corresponding to the multiple-image region in a state where the different image is displayed in the multiple-image region, the caution-target object being an object for which the user has to heed caution, the image control unit may cause the display unit to display a notification about the presence of the caution-target object. In response to a predetermined operation performed by the user after starting displaying the notification, the image control unit may cause the captured image to be displayed instead of the different image in the multiple-image region.

Accordingly, even in the state where the different image is displayed, it is possible to notify the user of the caution-target object within the multiple-image region. In addition, until the user performs a predetermined operation, the different image is not switched to the captured image. Therefore, it is possible to reduce the feeling of strangeness or cognitive load that the user may have if the different image is switched to the captured image without the user's intention.

If the different image is switched to the captured image in response to the predetermined operation performed by the user after starting displaying the notification, the image control unit may display the caution-target object in an emphasized manner in the captured image. Accordingly, the user can easily recognize which object is the caution-target object.

The display unit may be included in an electronic rear-view mirror of a vehicle, the electronic rear-view mirror being disposed in front of and above the user. The captured image may include an image of the region behind the vehicle. While the vehicle is traveling forward or is in drive mode, the image control unit may allow switching between the image of the region behind the vehicle and the different image in the multiple-image region and may fix the position of the captured-image-only region.

Accordingly, by fixing the position of the captured-image-only region while the vehicle is traveling forward or is in drive mode, it is possible to reduce the user's (driver's) feeling of strangeness or cognitive load, and by allowing switching between the image of the region behind the vehicle and the different image, it is possible to increase user convenience.

An image display device according to another embodiment of the present disclosure includes an image control unit that causes a display unit to display an image captured by a camera. The image control unit provides, on a display screen of the display unit, a captured-image-only region in which only the captured image is displayed when the display unit displays the captured image and a multiple-image region in which the captured image or a different image that is different from the captured image is selectively displayed when the display unit displays the captured image. If a predetermined target is present within the captured image corresponding to the captured-image-only region, the image control unit changes a position of the captured-image-only region on the display screen in such a manner that a change in a position of the predetermined target in a lateral direction is suppressed.

According to the embodiment of the present disclosure, the multiple-image region is provided in addition to the captured-image-only region. Accordingly, by displaying the different image simultaneously with the captured image, such as an image of the periphery of a vehicle, it is possible to increase user convenience regarding the use of the captured image.

In addition, according to the embodiment of the present disclosure, if a predetermined target is present within the captured image corresponding to the captured-image-only region, the position of the captured-image-only region on the display screen is changed in such a manner that the change in the position of the predetermined target in the lateral direction is suppressed. Accordingly, even if the image display device or the predetermined target is shaky in the lateral direction, the change in the position of the predetermined target on the display screen is small. Therefore, it is possible to reduce the user's cognitive load on the predetermined target. In addition, it is possible to reduce the feeling of strangeness or cognitive load that the user has if the display area of the captured image is changed in response to starting or ending displaying the different image.

According to the present disclosure, it is possible to increase user convenience if a captured image, such as an image of the periphery of a vehicle, and a different image are simultaneously displayed. The word "unit" used in this application may mean a physical part or component of computer hardware or any device including a controller, a processor, a memory, etc., which is particularly configured to perform functions and steps disclosed in the application.

BRIEF DESCRIPTION OF THE DRAWINGS

FIG. 6 is a flowchart illustrating a caution-target-object notification process (details of S17 in FIG. 3) in the embodiment.

DESCRIPTION OF THE PREFERRED EMBODIMENTS

A. Embodiment
A-1. Configuration
A-1-1. Overall Configuration

Figure 1:
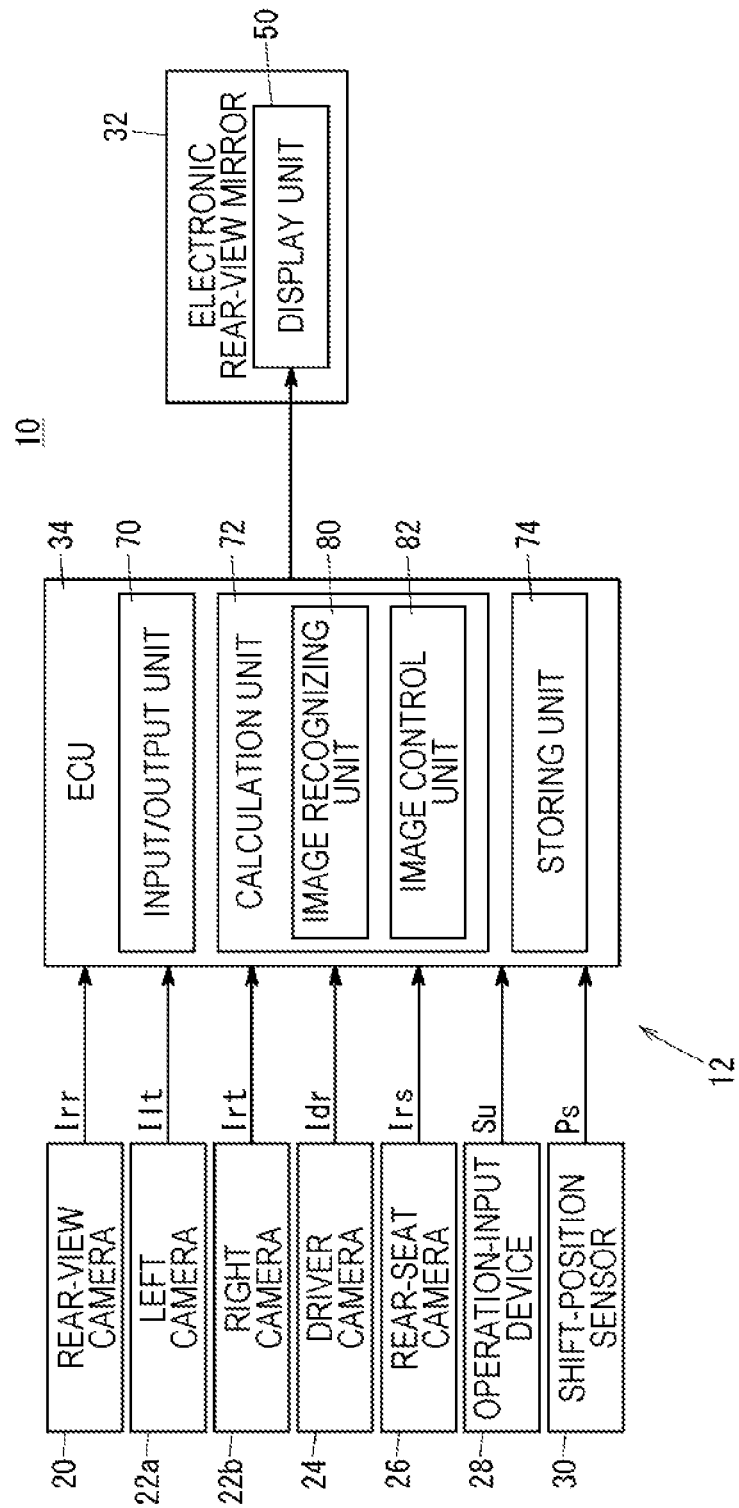
FIG. 1 schematically illustrates the configuration of a vehicle in which an image display device according to an embodiment of the present disclosure is installed.

FIG. 1 schematically illustrates the configuration of a vehicle 10 in which an image display device 12 according to an embodiment of the present disclosure is installed. As illustrated in FIG. 1, the image display device 12 includes a rear-view camera 20, side cameras 22a and 22b, a driver camera 24, a rear-seat camera 26, an operation-input device 28, a shift-position sensor 30, an electronic rear-view mirror 32, and an electronic control unit 34 (hereinafter referred to as "ECU 34"). The vehicle 10 according to the embodiment is a car with a steering wheel on the right-hand side. Alternatively, it is possible to employ substantially the same configuration for a car with a steering wheel on the left-hand side. Hereinafter, the rear-view camera 20, the side cameras 22a and 22b, the driver camera 24, and the rear-seat camera 26 are also referred to as cameras 20, 22a, 22b, 24, and 26.

A-1-2. Rear-View Camera 20

The rear-view camera 20 is a color camera that captures an image (hereinafter referred to as "rear-region image Irr") of the region behind the vehicle 10. The rear-region image Irr is displayed on the electronic rear-view mirror 32 in order to assist the driver's operation when the vehicle 10 moves backward and to allow the driver to check the region behind the vehicle 10 while the vehicle 10 is moving forward.

The rear-view camera 20 is disposed at the back of the vehicle 10 to face the region behind the vehicle 10. More specifically, the rear-view camera 20 is disposed on a rear bumper, for example. Alternatively, the rear-view camera 20 may be disposed near a rear window (e.g., the ceiling) in the vehicle cabin. Data of the rear-region image Irr captured by the rear-view camera 20 is output to the ECU 34.

A-1-3. Side Cameras 22a and 22b

Each of the side cameras 22a and 22b is a color camera that captures an image (hereinafter referred to as "side image Isd") of a region next to the vehicle 10. The side camera 22a (hereinafter also referred to as "left camera 22a") captures an image (hereinafter also referred to as "left-side image Ilt") of the left of the vehicle 10. The side camera 22b (hereinafter also referred to as "right camera 22b") captures an image (hereinafter also referred to as "right-side image Irt") of the right of the vehicle 10. The side image Isd is used by the driver to check the side (including rear side) of the vehicle 10 while the vehicle 10 is moving forward or backward.

The side cameras 22a and 22b are disposed on the sides (e.g., side mirrors) of the vehicle 10 to face regions behind and next to the vehicle 10. Data of the side image Isd captured by the side cameras 22a and 22b is output to the ECU 34.

A-1-4. Driver Camera 24

The driver camera 24 is a color camera that captures an image (hereinafter referred to as "driver image Idr") of substantially the front of the driver. The driver image Idr is, for example, used to process the movement of the driver as operation input. The method of the operation input is described in, for example, Japanese Unexamined Patent Application Publication No. 2013-216286, the entire contents of which are incorporated herein by reference. The driver camera 24 is disposed in front of the driver's seat (not illustrated) (e.g., near the electronic rear-view mirror 32) to face the driver's seat. Data of the driver image Idr captured by the driver camera 24 is output to the ECU 34.

A-1-5. Rear-Seat Camera 26

The rear-seat camera 26 is a color camera that captures an image (hereinafter referred to as "rear-seat image Irs") of substantially the front of the rear seat (not illustrated). The rear-seat image Irs reflects a vehicle occupant or vehicle occupants seated on the rear seat. The rear-seat camera 26 is disposed in front of and above the rear seat to face the rear seat. Data of the rear-seat image Irs captured by the rear-seat camera 26 is output to the ECU 34.

A-1-6. Operation-Input Device 28

The operation-input device 28 receives a predetermined instruction from the user (e.g., the driver) regarding the displaying on the electronic rear-view mirror 32 (a display unit 50 described later) and includes an operation button or a touchscreen, for example. Examples of the instruction here include a display-mode switching instruction, which will be described later, and the like. The operation-input device 28 outputs an instruction signal Su indicating the received instruction to the ECU 34.

A-1-7. Shift-Position Sensor 30

The shift-position sensor 30 detects the position (hereinafter referred to as "shift position Ps") of a shift lever, which is not illustrated, and outputs information on the position to the ECU 34.

A-1-8. Electronic Rear-View Mirror 32

The electronic rear-view mirror 32 (hereinafter also referred to as "electronic mirror 32" or "mirror 32") is disposed in front of and above the driver in the vehicle cabin. More specifically, the mirror 32 is disposed on the proximate side (the rear side with respect to the heading direction of the vehicle 10) of the driver (vehicle occupant) on the upper portion of the windshield (not illustrated). The mirror 32 includes the display unit 50 (FIG. 1) that displays a peripheral image Isr of the vehicle 10. The peripheral image Isr here is formed of, for example, only the rear-region image Irr or a combination of the rear-region image Irr and the side image Isd. Accordingly, the driver can check the state behind and/or next to the vehicle 10 through the display unit 50 of the mirror 32.

In the embodiment, the display unit 50 is formed of, for example, a liquid crystal panel or a display panel such as an organic electroluminescent (EL) panel. Alternatively, the display unit 50 may be a projection unit onto which a projection image is projected by a projector, which is not illustrated.

Note that, as described above, the rear-view camera 20 and the side cameras 22a and 22b face outward of the vehicle 10. Accordingly, neither the rear-region image Irr nor the side image Isd includes an image of the inside of the vehicle 10. Therefore, in normal use, the display unit 50 of the mirror 32 does not display the image of the inside of the vehicle 10. That is, the image (peripheral image Isr) displayed by the display unit 50 is different from the image reflected by a typical rear-view mirror (having the mirror plane).

In addition, a mirror position adjusting mechanism (hereinafter also referred to as "adjusting mechanism"), which is not illustrated, may be provided so that a position P (hereinafter referred to as "mirror position Pmr") of the mirror 32 can be adjusted by the driver's operation. The adjusting mechanism includes, for example, a tilt angle adjusting mechanism and a rotation angle adjusting mechanism. The tilt angle adjusting mechanism is a mechanism that adjusts the tilt angle of the mirror 32 in the transversal (width), vertical, and longitudinal directions of the vehicle 10. The rotation angle adjusting mechanism is a mechanism that adjusts the rotation angle of the mirror 32. The tilt angle adjusting mechanism and the rotation angle adjusting mechanism are each formed of, for example, a ball joint. Alternatively, the adjusting mechanism may include a mechanism (e.g., a slider mechanism) that three-dimensionally and linearly displaces the mirror position Pmr.

A-1-9. ECU 34

A-1-9-1. Overview of ECU 34

The ECU 34 controls an image to be displayed by the display unit 50 of the mirror 32 and includes an input/output unit 70, a calculation unit 72, and a storing unit 74. The input/output unit 70 is used for inputting and outputting signals. The input/output unit 70 can include an analog-to-digital converter and a digital-to-analog converter. The calculation unit 72 performs various controls by using programs and data stored in the storing unit 74. The calculation unit 72 includes a central processing unit (CPU). Details of the calculation unit 72 will be described later.

The storing unit 74 stores programs and data used by the calculation unit 72 and includes a random-access memory (hereinafter referred to as "RAM"). Examples of the RAM include a volatile memory such as a register and a nonvolatile memory such as a flash memory. In addition to the RAM, the storing unit 74 may include a read-only memory (ROM).

A-1-9-2. Calculation Unit 72

As illustrated in FIG. 1, the calculation unit 72 includes an image recognizing unit 80 and an image control unit 82.

The image recognizing unit 80 recognizes or detects a specific target (e.g., a caution-target object Ot described later) in the peripheral image Isr by using pattern matching.

The image control unit 82 controls the peripheral image Isr to be displayed by the display unit 50 by using images (hereinafter also referred to as "captured images Icp") captured by the cameras 20, 22a, 22b, 24, and 26. Hereinafter, captured images Icp obtained by the rear-view camera 20, the side camera 22a, the side camera 22b, the driver camera 24, and the rear-seat camera 26 are respectively also referred to as captured images Irr, Ilt, Irt, Idr, and Irs. The image control unit 82 extracts a part of the captured images Icp on the basis of a predetermined extraction area Rsb and causes the display unit 50 to display the extracted part as the peripheral image Isr.

A-2. Mirror Display Control

Next, mirror display control in the embodiment will be described. The mirror display control is control regarding the displaying on the mirror 32, which is performed by the ECU 34.

A-2-1. Display Mode of Electronic Rear-View Mirror 32 (Display Unit 50)

In the mirror display control in the embodiment, a different-image display mode or a peripheral-image-only display mode is used as the display mode of the mirror 32 (or the display unit 50). The different-image display mode is a mode in which the display unit 50 displays both the peripheral image Isr and a different image Ia. The peripheral-image-only display mode is a mode in which the display unit 50 displays only the peripheral image Isr.

Figure 2A:
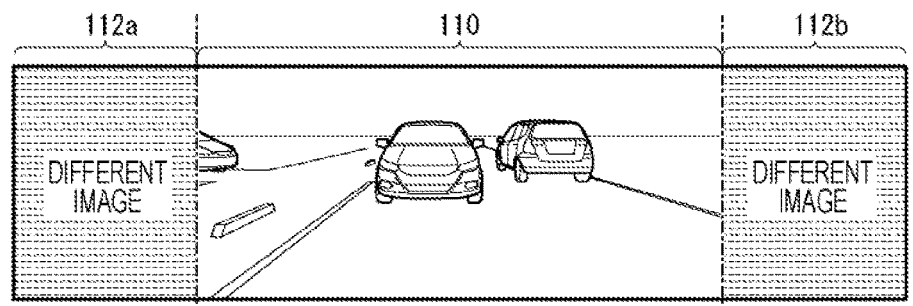
FIG. 2A illustrates an example of a display screen in a different-image display mode in the embodiment.
Figure 2B:
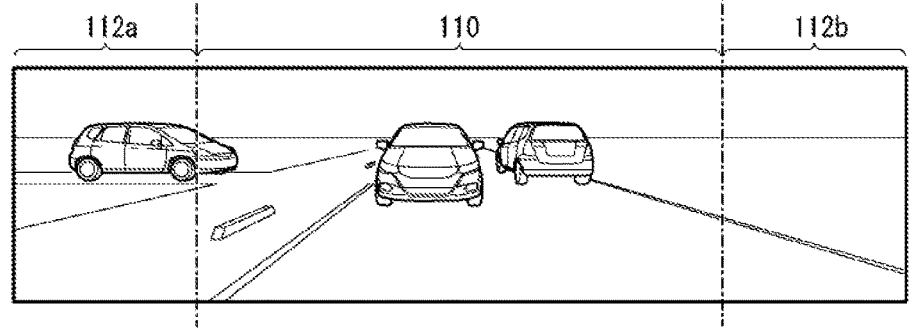
FIG. 2B illustrates an example of a display screen on a peripheral-image-only display mode in the embodiment.

FIG. 2A illustrates an example of a display screen 100 in the different-image display mode in the embodiment. FIG. 2B illustrates an example of a display screen 102 in the peripheral-image-only display mode in the embodiment. Hereinafter, the display screen 100 in the different-image display mode in FIG. 2A is also referred to as a display screen 100a, and the display screen 102 in the peripheral-image-only display mode in FIG. 2B is also referred to as a display screen 102a. The dot-dash lines in FIGS. 2A and 2B are virtual lines or imaginary lines and are not displayed on the actual display screens 100 and 102.

As illustrated in FIGS. 2A and 2B, each of the display screens 100 and 102 of the display unit 50 according to the embodiment includes a peripheral-image-only region 110 (hereinafter also referred to as "region 110") and multiple-image regions 112a and 112b. If the display unit 50 displays the peripheral image Isr, the region 110 is a region in which only the peripheral image Isr is displayed. If the display unit 50 displays the peripheral image Isr, each of the multiple-image regions 112a and 112b is a region in which the peripheral image Isr or the different image Ia different from the peripheral image Isr is selectively displayed. Hereinafter, the multiple-image regions 112a and 112b are collectively called multiple-image regions 112.

On the display screen 100 in the different-image display mode, in principle, the different image Ia is displayed in the multiple-image regions 112. Examples of the different image Ia here include an image displaying the current time, the rear-seat image Irs, an image for operating audio equipment, and the like (specific illustrations are omitted in FIG. 2A and other drawings). If only the rear-region image Irr is displayed in the region 110, the side image Isd may be displayed in the multiple-image regions 112a and 112b as the different image Ia.

On the display screen 102 in the peripheral-image-only display mode, the peripheral image Isr is displayed in the multiple-image regions 112a and 112b in addition to the region 110. The peripheral image Isr here is, for example, a composite image of the rear-region image Irr and the side image Isd. Alternatively, only the rear-region image Irr may be displayed in the region 110 and the multiple-image regions 112a and 112b as the peripheral image Isr.

As illustrated in FIGS. 2A and 2B, on each of the display screens 100 and 102, the position of the peripheral-image-only region 110 is fixed.

A-2-2. Overall Flow of Mirror Display Control

Figure 3:
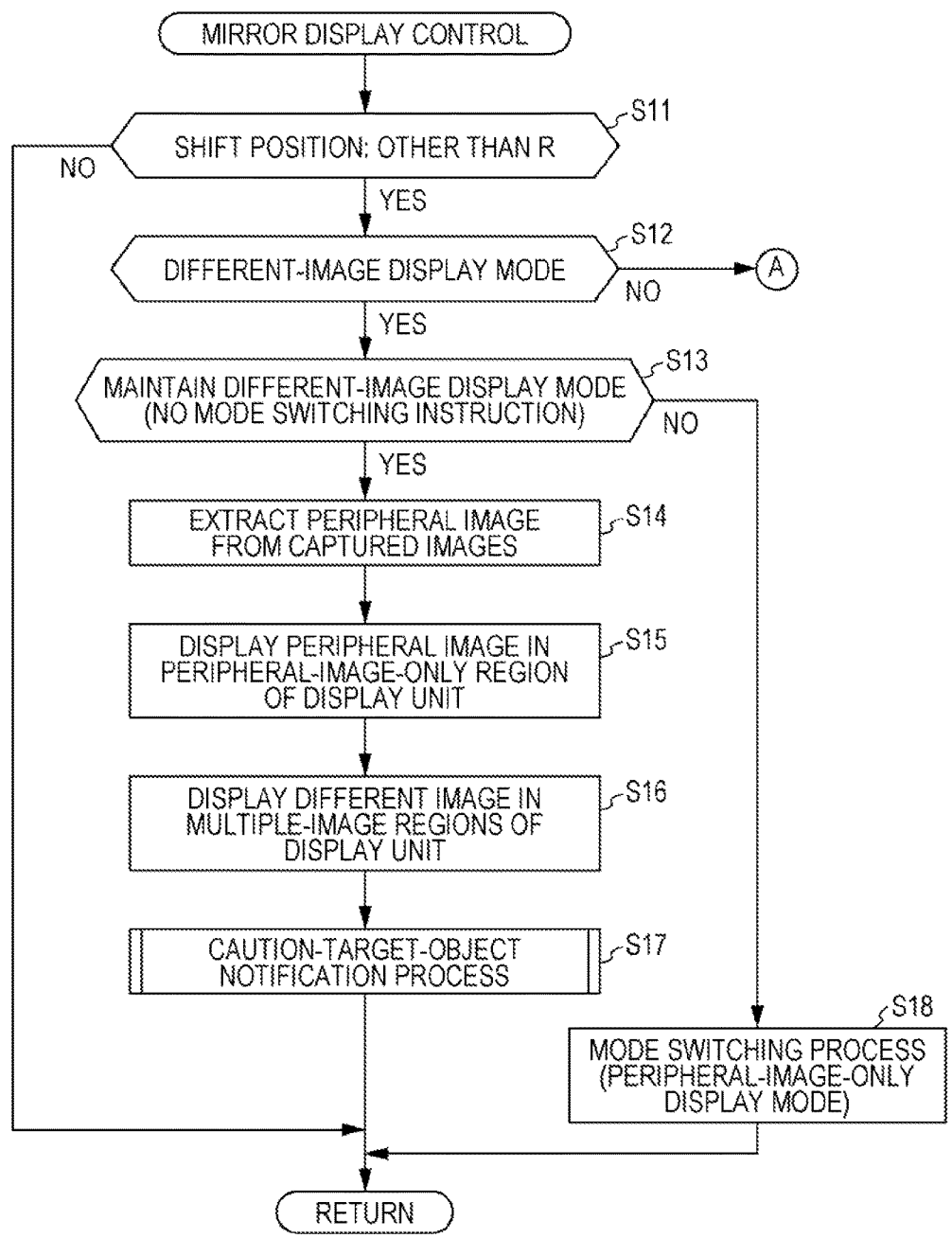
FIG. 3 is a first flowchart illustrating mirror display control in the embodiment.
Figure 4:
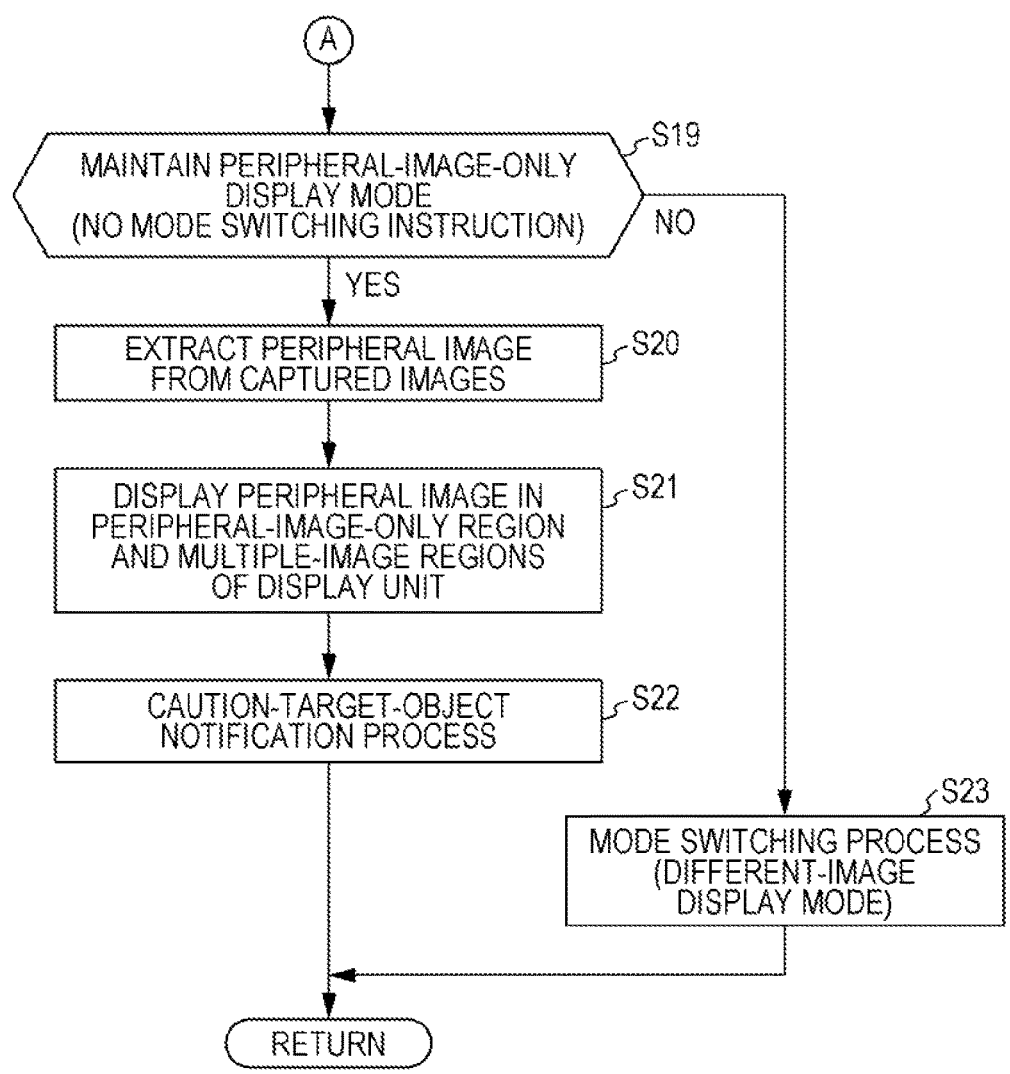
FIG. 4 is a second flowchart illustrating the mirror display control in the embodiment.

FIG. 3 and FIG. 4 respectively are a first flowchart and a second flowchart illustrating the mirror display control in the embodiment. In step S11 in FIG. 3, the ECU 34 determines whether the shift position Ps is other than reverse (R). The shift position Ps other than R is, for example, drive mode (D) or neutral mode (N).

If the shift position Ps is R (NO in S11), the ECU 34 causes an image corresponding to R to be displayed. Note that FIG. 3 does not include an illustration of a step corresponding to R. Alternatively, the mirror display control may be performed by skipping step S11 regardless of the shift position Ps being R or not. If the shift position Ps is other than R (YES in S11), it is determined in step S12 whether the display mode of the mirror 32 (or the display unit 50) is the different-image display mode. If the display mode is the different-image display mode (YES in S12), the ECU 34 determines in step S13 whether the different-image display mode is to be maintained, in other words, whether a display-mode switching instruction has already been input through the operation-input device 28.

If the different-image display mode is maintained (YES in S13), in step S14, the ECU 34 extracts the peripheral image Isr from the captured images Icp. As described above, in the different-image display mode, in principle, the peripheral image Isr is displayed only in the peripheral-image-only region 110. In addition, the position of the region 110 on the display screen 100 is fixed (FIG. 2A). Accordingly, the extraction area Rsb to be used in step S14 is fixed in accordance with the region 110.

In step S15, the ECU 34 causes the peripheral image Isr extracted in step S14 to be displayed in the region 110 of the display unit 50. In step S16, the ECU 34 causes the different image Ia to be displayed in the multiple-image regions 112 of the display unit 50.

In step S17, the ECU 34 performs a caution-target-object notification process. The caution-target-object notification process is a process for notifying the driver of an object (hereinafter referred to as "caution-target object Ot") for which the driver has to heed caution. Details of the caution-target-object notification process will be described later with reference to FIG. 6.

Referring back to step S13 in FIG. 3, if the different-image display mode is not to be maintained (NO in S13), in other words, if the display-mode switching instruction has been input through the operation-input device 28, the process proceeds to step S18. In step S18, the ECU 34 performs a mode switching process (first mode switching process) for switching the display mode from the different-image display mode to the peripheral-image-only display mode. As a result of the first mode switching process, the ECU 34 selects the peripheral-image-only display mode as the display mode.

Figure 5A:
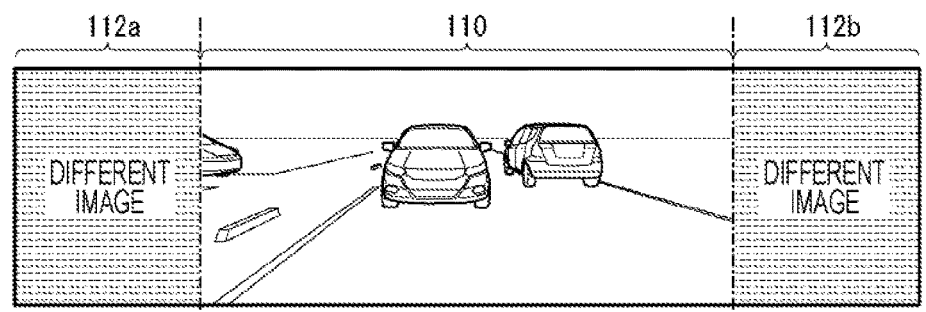
FIG. 5A illustrates a first example the display screen in a mode switching process in the embodiment.
Figure 5B:
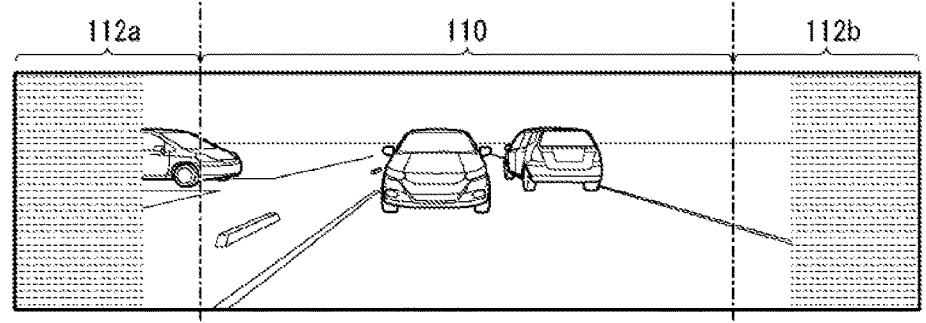
FIG. 5B illustrates a second example of the display screen in the mode switching process in the embodiment.
Figure 5C:
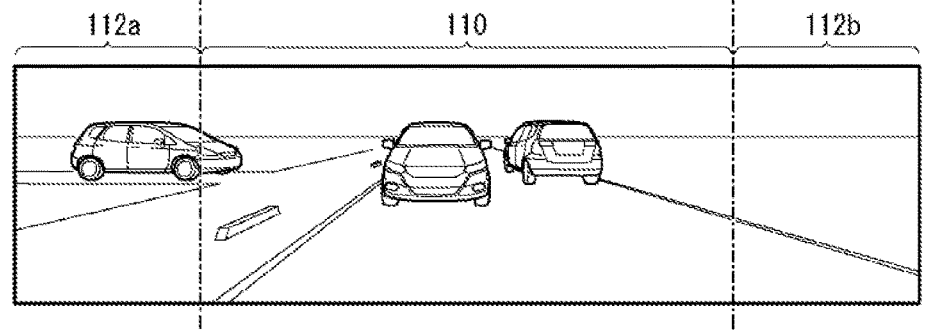
FIG. 5C illustrates a third example of the display screen in the mode switching process in the embodiment.

FIG. 5A, FIG. 5B, and FIG. 5C respectively illustrate a first example, a second example, and a third example of the display screen 100 in the mode switching process in the embodiment. The display screen 100 in FIGS. 5A to 5C corresponds to a display screen in the different-image display mode. Hereinafter, the display screen 100 in the different-image display mode in FIG. 5A, the display screen 100 in the different-image display mode in FIG. 5B, and the display screen 100 in the different-image display mode in FIG. 5C are respectively also referred to as a display screen 100*b*, a display screen 100*c*, and a display screen 100*d*. The display screen 100*b* in FIG. 5A is the same as the display screen 100*a* in FIG. 2A.

As illustrated in FIGS. 5A to 5C, in the mode switching process, the display area of the peripheral image Isr is caused to gradually increase (fade in) from the region 110 toward the multiple-image regions 112*a* and 112*b*. On the other hand, the display area of the different image Ia is caused to gradually decrease (fade out). During switching between the peripheral image Isr and the different image Ia in the multiple-image regions 112*a* and 112*b*, the extraction area Rsb and the display magnitude of the peripheral image Isr displayed in the region 110 are not changed.

Referring back to step S12 in FIG. 3, if the display mode is not the different-image display mode (NO in S12), in other words, if the display mode is the peripheral-image-only display mode, the process proceeds to step S19 in FIG. 4.

In step S19 in FIG. 4, the ECU 34 determines whether the peripheral-image-only display mode is to be maintained, in other words, whether the whether has already been input through the operation-input device 28.

If the peripheral-image-only display mode is maintained (YES in S19), in step S20, the ECU 34 extracts the peripheral image Isr from the captured images Icp. As described above, in the peripheral-image-only display mode, the peripheral image Isr is displayed in the peripheral-image-only region 110 and the multiple-image regions 112*a* and 112*b* (FIG. 2B). Accordingly, the extraction area Rsb to be used in step S20 is fixed in accordance with the region 110 and the multiple-image regions 112*a* and 112*b*.

In step S21, the ECU 34 causes the peripheral image Isr extracted in step S20 to be displayed in the region 110 and the multiple-image regions 112*a* and 112*b* of the display unit 50. In step S22, the ECU 34 performs a caution-target-object notification process. The caution-target-object notification process in step S22 is substantially the same as a part of the caution-target-object notification process in step S17 (FIG. 6), and details thereof will be described later.

Referring back to step S19 in FIG. 4, if the peripheral-image-only display mode is not to be maintained (NO in S19), in other words, if the display-mode switching instruction has been input through the operation-input device 28, the process proceeds to step S23. In step S23, the ECU 34 performs a mode switching process (second mode switching process) for switching the display mode from the peripheral-image-only display mode to the different-image display mode. As a result of the second mode switching process, the ECU 34 selects the different-image display mode as the display mode.

Switching from the peripheral-image-only display mode to the different-image display mode is a reverse operation of switching (FIGS. 5A to 5C) from the different-image display mode to the peripheral-image-only display mode. That is, if the display mode is switched from the peripheral-image-only display mode to the different-image display mode, in the multiple-image regions 112*a* and 112*b*, the display area of the different image Ia is caused to gradually increase (fade in) toward the region 110. On the other hand, the display area of the peripheral image Isr is caused to gradually decrease (fade out). Accordingly, the display area changes in the order of FIG. 5C, FIG. 5B, and FIG. 5A.

A-2-3. Caution-Target-Object Notification Process

Figure 7A:
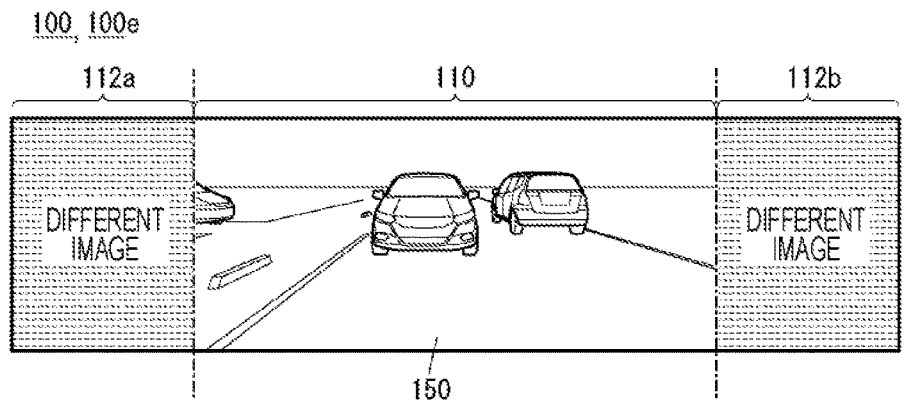
FIG. 7A illustrates a first example of the display screen in the caution-target-object notification process in the embodiment.
Figure 7B:
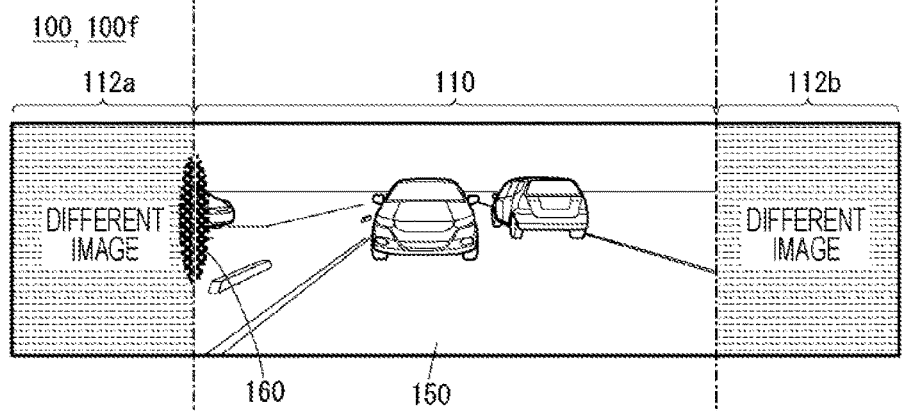
FIG. 7B illustrates a second example of the display screen in the caution-target-object notification process in the embodiment.
Figure 7C:
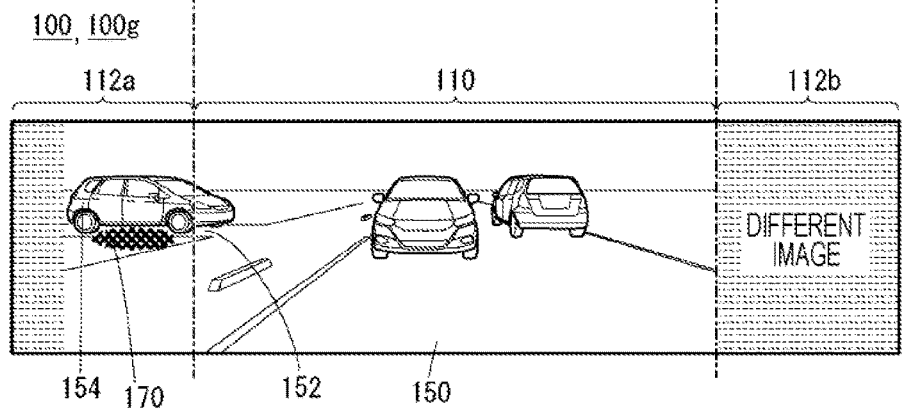
FIG. 7C illustrates a third example of the display screen in the caution-target-object notification process in the embodiment.

FIG. 6 is a flowchart illustrating the caution-target-object notification process (details of S17 in FIG. 3) in the embodiment. FIG. 7A, FIG. 7B, and FIG. 7C respectively illustrate a first example, a second example, and a third example of the display screen 100 in the caution-target-object notification process in the embodiment. The display screen 100 in FIGS. 7A to 7C corresponds to a display screen in the different-image display mode. Hereinafter, the display screen 100 in the different-image display mode in FIG. 7A, the display screen 100 in the different-image display mode in FIG. 7B, and the display screen 100 in the different-image display mode in FIG. 7C are respectively also referred to as a display screen 100*e*, a display screen 100*f*, and a display screen 100*g*. The display screen 100*e* in FIG. 7A is the same as the display screen 100*a* in FIG. 2A and the display screen 100*b* in FIG. 5A. As described above, step S17 in FIG. 3 is performed while the different-image display mode is selected.

In step S31 in FIG. 6, the ECU 34 determines whether the caution-target object Ot is present in the multiple-image regions 112. The caution-target object Ot is an object for which the driver has to heed caution. The caution-target object Ot, for example, corresponds to a peripheral vehicle 154 (FIG. 7C) traveling from a side road 152 of a traveling lane 150 of the vehicle 10 (hereinafter also referred to as "subject vehicle 10").

Although the peripheral vehicle 154 in FIG. 7C is a four-wheel automobile, the peripheral vehicle 154 may be a motorcycle, a bicycle, or the like. The caution-target object Ot may be a person near the traveling lane 150. The image recognizing unit 80 recognizes or detects the caution-target object Ot by using pattern matching.

Note that, as described above, the electronic mirror 32 displays the rear-region image Irr of the vehicle 10. Accordingly, in principle, if the subject vehicle 10 and the peripheral vehicle 154 have such a positional relationship as illustrated in FIG. 7C, except when the vehicle 10 is moving backward, the peripheral vehicle 154 is unlikely to pose a danger to the subject vehicle 10. However, since the electronic mirror 32 can display the side image Isd, if the peripheral vehicle 154 is approaching the subject vehicle 10 behind the subject vehicle 10, it is useful to display a notification about the peripheral vehicle 154 behind the subject vehicle 10 even when the subject vehicle 10 is moving forward or stopped.

Note that the entire peripheral vehicle 154 is displayed in FIG. 7C because a partial image of the peripheral vehicle 154 due to zooming in would hinder understanding.

Note that the driver is not notified even if the caution-target object Ot is present in the region 110 in the embodiment. This is because the peripheral image Isr is displayed in the region 110 and it is considered that the driver has already noticed the caution-target object Ot. Alternatively, the driver may be notified of the caution-target object Ot in the region 110.

If it is determined that the caution-target object Ot is absent in both of the multiple-image regions 112 (NO in S31), the caution-target-object notification process of this cycle ends. If it is determined that the caution-target object Ot is present in at least one of the multiple-image regions 112 (YES in S31), the process proceeds to step S32.

In step S32, the ECU 34 causes the display unit 50 to display a notification 160 (FIG. 7B) that notifies the driver of the presence of the caution-target object Ot in the multiple-image region 112. Specifically, as illustrated in FIG. 7B, the ECU 34 causes the notification 160 to blink between the region 110 and the multiple-image region 112 (the multiple-image region 112*a* here) where the caution-target object Ot is present. The notification 160 has a color (e.g., red or yellow) that is easily noticeable by the driver. The notification 160 may have any other form as long as the presence of the caution-target object Ot is presented. In addition to or in place of displaying the notification 160, a sound (or voice) announcing the presence of the caution-target object Ot may be output through a speaker, which is not illustrated.

In step S33, the ECU 34 determines whether a peripheral-image increase instruction has been input by the driver through the operation-input device 28. The peripheral-image increase instruction is an instruction for requesting the increase of the display area of the peripheral image Isr from the region 110 to the multiple-image region 112 (here, the multiple-image region 112a where the caution-target object Ot is present).

If the peripheral-image increase instruction has not been input (NO in S33), the process returns to step S31. If the peripheral-image increase instruction has been input (YES in S33), in step S34, the ECU 34 increases the display area of the peripheral image Isr to the multiple-image region 112 (see FIG. 7C).

Although a part of the different image Ia remains displayed in the multiple-image region 112a in FIG. 7C, the different image Ia may be completely hidden from being displayed. If the caution-target object Ot can be displayed with a sufficiently large size, the part of the different image Ia may remain displayed.

In step S35, the ECU 34 performs an emphasis process for displaying the caution-target object Ot in an emphasized manner. Specifically, as illustrated in FIG. 7C, the ECU 34 causes an emphasis display object 170 to blink in the periphery of (here, below) the caution-target object Ot. The emphasis display object 170 has a color (e.g., red or yellow) that is easily noticeable by the driver. The emphasis display object 170 may have any other form as long as the caution-target object Ot is emphasized. In addition to or in place of the emphasis display object 170, a sound (or voice) announcing the presence of the caution-target object Ot may be output through a speaker, which is not illustrated.

In step S36, the ECU 34 determines whether the emphasis process is to end. The determination can be performed, for example, on the basis of whether the caution-target object Ot has moved to be outside the multiple-image region 112. If the emphasis process is not to end (NO in S36), the process returns to step S35, and the emphasis process is continued. If the emphasis process is to end (YES in S36), the process proceeds to step S37.

In step S37, the ECU 34 causes the different image Ia to be displayed again in the multiple-image region 112, the different image Ia having temporarily been hidden from being displayed in response to the increase (S34) of the display area of the peripheral image Isr.

Note that the caution-target-object notification process in step S22 in FIG. 4 is substantially the same as S35 and S36 in FIG. 6.

A-3. Effects of Embodiment

As described above, according to the embodiment, the multiple-image regions 112a and 112b are provided in addition to the peripheral-image-only region 110 (captured-image-only region) (FIGS. 2A and 2B). Accordingly, by displaying the different image Ia simultaneously with the peripheral image Isr (captured images Icp) of the vehicle 10, the driver's (user) convenience regarding the use of the peripheral image Isr of the vehicle 10 can be increased.

In addition, in the embodiment, the position of the peripheral-image-only region 110 on the display screens 100 and 102 is fixed (FIGS. 2A and 2B). Accordingly, even if the displaying of the different image Ia is started or ended, the position of the peripheral-image-only region 110 on the display screens 100 and 102 does not change. Therefore, it is possible to reduce the feeling of strangeness or cognitive load that the driver has if the display area of the peripheral image Isr is changed in response to starting or ending displaying the different image Ia. Thus, the driver's convenience can be increased if the peripheral image Isr of the vehicle 10 and the different image Ia are simultaneously displayed.

In the embodiment, if the different image Ia is to be displayed in the multiple-image regions 112 in the state where the peripheral image Isr (captured images Icp) is displayed in the multiple-image regions 112 (FIG. 2B), the image control unit 82 fixes the position of the peripheral-image-only region 110 on the display screens 100 and 102 and causes the different image Ia to fade in while decreasing the display area of the peripheral image Isr in the multiple-image regions 112 (FIG. 5C→FIG. 5B→FIG. 5A). In addition, if the displaying of the different image Ia is to be ended in the state where the different image Ia is displayed in the multiple-image regions 112 (FIG. 2A), the image control unit 82 fixes the position of the peripheral-image-only region 110 on the display screens 100 and 102 and causes the different image Ia to fade out from the multiple-image regions 112 while increasing the display area of the peripheral image Isr (FIG. 5A→FIG. 5B→FIG. 5C).

Accordingly, the driver (user) can easily understand, by intuition, switching between the peripheral image Isr and the different image Ia in the multiple-image regions 112. In addition, even if the peripheral image Isr and the different image Ia are switched in the multiple-image regions 112, since the position of the peripheral-image-only region 110 is fixed, it is possible to reduce the driver's feeling of strangeness or cognitive load.

In the embodiment, in the state where the different image Ia is displayed in the multiple-image regions 112 (FIG. 2A), if the caution-target object Ot for which the driver has to heed caution is present within the peripheral image Isr corresponding to the multiple-image regions 112 (YES in S31 in FIG. 6), the image control unit 82 causes the display unit 50 to display the notification 160 regarding the presence of the caution-target object Ot (S32 in FIG. 6, FIG. 7B). In response to the driver's input (predetermined operation) of the peripheral-image increase instruction (YES in S33 in FIG. 6) after starting displaying the notification 160, the image control unit 82 causes the peripheral image Isr to be displayed in the multiple-image regions 112 (S34 in FIG. 6, FIG. 7C) instead of the different image Ia.

Accordingly, even in the state where the different image Ia is displayed, it is possible to notify the driver of the caution-target object Ot within the multiple-image regions 112. In addition, until the driver performs a predetermined operation, the different image Ia is not switched to the peripheral image Isr (NO in S33 in FIG. 6). Therefore, it is possible to reduce the feeling of strangeness or cognitive load that the driver may have if the different image Ia is switched to the peripheral image Isr without the driver's intention.

In the embodiment, if the different image Ia is switched to the peripheral image Isr in response to the driver's input (predetermined operation) of the peripheral-image increase instruction (YES in S33 in FIG. 6) after starting displaying the notification 160, the image control unit 82 causes the caution-target object Ot to be displayed in an emphasized manner in the peripheral image Isr (S35 in FIG. 6, FIG. 7C). Accordingly, the driver can easily recognize which object is the caution-target object Ot.

In the embodiment, the display unit 50 is included in the electronic rear-view mirror 32 (FIG. 1) disposed in front of and above the driver. In addition, the peripheral image Isr (captured images Icp) includes the rear-region image Irr of the vehicle 10 (FIGS. 2A and 2B). Furthermore, if the shift position Ps is other than R (if the vehicle 10 is in drive mode) (YES in S11 in FIG. 3), the image control unit 82 allows switching between the peripheral image Isr and the different image Ia in the multiple-image regions 112 (S18, S23) and fixes the position of the peripheral-image-only region 110 (FIGS. 2A and 2B). Accordingly, by fixing the position of the peripheral-image-only region 110 if the shift position Ps is other than R, it is possible to reduce the driver's feeling of strangeness or cognitive load, and by allowing switching between the peripheral image Isr and the different image Ia, it is possible to increase the driver's convenience.

B. Modification

As a manner of course, the present disclosure can employ various configurations on the basis of the contents herein in addition to the above embodiment. For example, it is possible to employ the following configuration.

B-1. Install Target

In the above embodiment, the image display device 12 is installed in the vehicle 10 (FIG. 1). However, the image display device 12 may be installed in another target in order to use, for example, the region 110 and the multiple-image regions 112. For example, the image display device 12 may be applied to a moving object such as a vessel or an aircraft. Alternatively, the image display device 12 may be used for a movable device such as a crane.

B-2. Display Unit 50

Although the display unit 50 is disposed in the electronic rear-view mirror 32 (FIG. 1) in the above embodiment, the display unit 50 may be disposed at another position as long as the display unit 50 displays the peripheral image Isr (captured images Icp) of the vehicle 10 or another target. For example, the display unit 50 can be disposed in side-view mirrors (wing mirrors) of the vehicle 10 or a navigation device, which is not illustrated. Alternatively, the display unit 50 may be disposed in the windshield or the like as a head-up display (HUD).

B-3. Rear-View Camera 20 and Side Cameras 22a and 22b

Although each of the rear-view camera 20 and the side cameras 22a and 22b is a color camera in the above embodiment, another camera may be used as long as the captured images Icp that are used to obtain the peripheral image Isr of the vehicle 10 are obtained. For example, for use at night or the like, a monochrome camera or a near infrared camera may be used as one or all of the rear-view camera 20 and the side cameras 22a and 22b.

In the above embodiment, the captured images Icp obtained by the rear-view camera 20 and the side cameras 22a and 22b are used as the peripheral image Isr (FIG. 2B). However, another captured image can also be used in order to use, for example, the peripheral-image-only region 110 and the multiple-image regions 112. For example, one of the captured images Icp obtained by the rear-view camera 20 and the side cameras 22a and 22b may be used. Alternatively, in addition to or in place of the above captured image Icp, the captured image Icp obtained by the rear-seat camera 26 can be used.

B-4. Operation-Input Device 28

The above embodiment has described an operation button and a touchscreen as examples of the operation-input device 28. However, another method can also be employed in order to use, for example, the peripheral-image-only region 110 and the multiple-image regions 112. For example, it is possible to input a driver's instruction by using the captured image Icp (driver image Idr) obtained by the driver camera 24.

Specifically, the movement of the driver's head or eyes is detected from the driver image Idr, and if a predetermined movement is detected, the movement can be regarded as the input of an instruction. As a technique to detect the movement of the head or eyes, the technique disclosed in Japanese Unexamined Patent Application Publication No. 2013-216286, for example, can be used. Alternatively, in the determination as to whether the peripheral-image increase instruction has been input (S33 in FIG. 6), it can be determined that the peripheral-image increase instruction has been input by the driver not performing an active operation within a predetermined period.

B-5. Peripheral-Image-Only Region 110 and Multiple-Image Regions 112

In the above embodiment, the two multiple-image regions 112a and 112b are provided at the left and right of the region 110 (FIG. 2A). However, the number of the multiple-image regions 112 is not limited to two in order to use, for example, the peripheral-image-only region 110 and the multiple-image regions 112. For example, one multiple-image region 112 or three or more multiple-image regions 112 can be used. In addition, the multiple-image region 112 or multiple-image regions 112 can be provided above or under the region 110.

B-6. Setting of Extraction Area Rsb

In the above embodiment, the condition for switching between the different-image display mode and the peripheral-image-only display mode is that the shift position Ps is other than R (S11 in FIG. 3). However, the condition is not limited to this in order to use, for example, the peripheral-image-only region 110 and the multiple-image regions 112. For example, step S11 in FIG. 3 may be skipped, and regardless of the shift position Ps being R or not, switching between the different-image display mode and the peripheral-image-only display mode can be performed. Alternatively, modifications can be made in such a manner that the process proceeds to step S12 only if the shift position Ps is R in step S11 in FIG. 3.

In the above embodiment, the position of the peripheral-image-only region 110 on the display screens 100 and 102 is fixed (FIGS. 2A and 2B). In other words, the extraction area Rsb for the region 110 is fixed. However, the extraction area Rsb for the region 110 does not have to be fixed in order to use, for example, the peripheral-image-only region 110 and the multiple-image regions 112.

Figure 8:
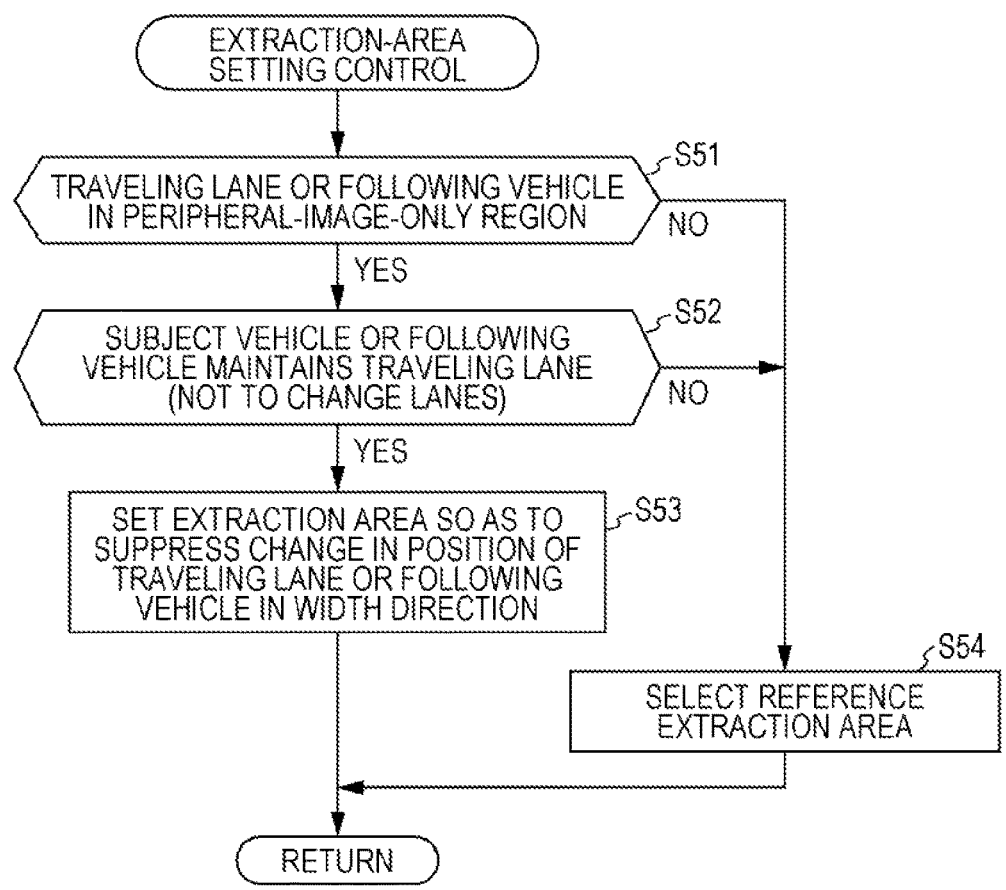
FIG. 8 is a flowchart illustrating extraction-area setting control according to a modification.
Figure 9A:
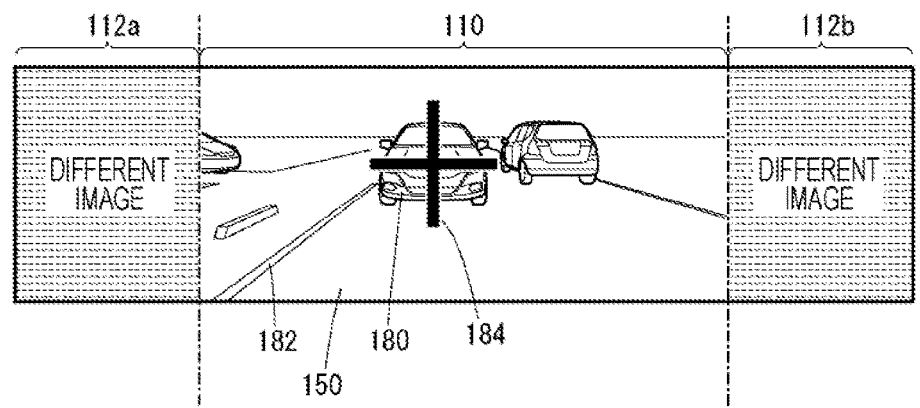
FIG. 9A illustrates an example of the display screen in the different-image display mode in the modification.
Figure 9B:
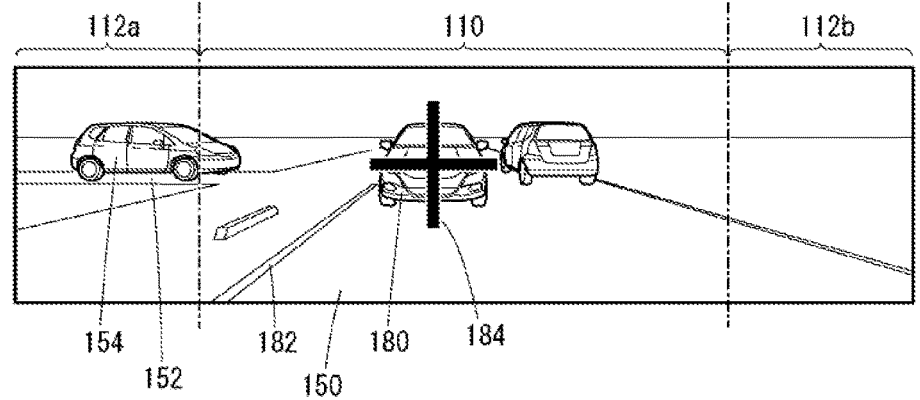
FIG. 9B illustrates an example of the display screen in the peripheral-image-only display mode in the modification.

FIG. 8 is a flowchart illustrating extraction-area setting control according to a modification. FIG. 9A illustrates an example of the display screen 100 in the different-image display mode in the modification. FIG. 9B illustrates an example of the display screen 102 in the peripheral-image-only display mode in the modification. Hereinafter, the display screen 100 in the different-image display mode in FIG. 9A is also referred to as a display screen 100h, and the display screen 102 in the peripheral-image-only display mode in FIG. 9B is also referred to as a display screen 102b.

Although the hardware configuration in the modification is substantially the same as that in the above embodiment (FIG. 1), the control performed by the ECU 34 is different. That is, the calculation unit 72 of the ECU 34 performs extraction-area setting control in which the display area of the peripheral-image-only region 110 is variable. In the extraction-area setting control here, if a predetermined target (target object) is present within the peripheral image Isr corresponding to the region 110, the position of the peripheral-image-only region 110 on the display screens 100 and 102 is set as a reference of the predetermined target. Examples of the predetermined target include the traveling lane 150 of the subject vehicle 10, a following vehicle 180, a bicycle, a pedestrian, and the like.

In the control illustrated in FIG. 8, the predetermined target is the traveling lane 150 and the following vehicle 180. Note that the term "traveling lane 150" here means the lane in which the subject vehicle 10 has already traveled. The extraction-area setting control is performed before at least one of step S14 in FIG. 3 and step S20 in FIG. 4 in the above embodiment.

In step S51 in FIG. 8, the ECU 34 determines whether the traveling lane 150 of the subject vehicle 10 or the following vehicle 180 is present in the peripheral-image-only region 110. The image recognizing unit 80 of the ECU 34 recognizes or detects the traveling lane 150 and the following vehicle 180 by using pattern matching. If the traveling lane 150 of the subject vehicle 10 or the following vehicle 180 is present (YES in S51), the process proceeds to step S52.

In step S52, the ECU 34 determines whether the subject vehicle 10 and the following vehicle 180 are maintaining the traveling lane 150. In other words, the ECU 34 determines whether the subject vehicle 10 or the following vehicle 180 is changing lanes. The lane changing of the subject vehicle 10 can be determined on the basis of the operation of a blinker switch, a steering angle, and the like. In addition, the lane changing of the following vehicle 180 can be determined on the basis of, for example, whether the distance between the following vehicle 180 and a lane mark 182 is a threshold or less or whether the following vehicle 180 has crossed the lane mark 182.

If the subject vehicle 10 and the following vehicle 180 are maintaining the traveling lane 150 (YES in S52), in step S53, the ECU 34 sets the extraction area Rsb in such a manner that the change in the position of the traveling lane 150 or the following vehicle 180 in the width direction (lateral direction) is suppressed.

For example, if the change in the position of the traveling lane 150 is to be suppressed, the ECU 34 sets the extraction area Rsb in such a manner that the position of the traveling lane 150 in the width direction is fixed in the peripheral-image-only region 110. Alternatively, the ECU 34 sets the extraction area Rsb by limiting the change amount of the position of the traveling lane 150 in the width direction per unit period to a predetermined value or less. The same applies if the following vehicle 180 is the target.

Note that the suppression of the change in the position of the following vehicle 180 has a priority over the suppression of the change in the position of the traveling lane 150 in the above example. Alternatively, the suppression of the change in the position of the traveling lane 150 may have a priority over the suppression of the change in the position of the following vehicle 180.

For example, on the display screens 100h and 102b in FIGS. 9A and 9B, a mark 184 (cross mark) indicating that the following vehicle 180 is the predetermined target is displayed at the position of the following vehicle 180. The ECU 34 performs step S53 by using the position of the mark 184 as a reference position in the width direction.

If neither the traveling lane 150 of the subject vehicle 10 nor the following vehicle 180 is present (NO in S51 in FIG. 8) or if the subject vehicle 10 or the following vehicle 180 is not maintaining the traveling lane 150 (NO in S52), the process proceeds to step S54. In step S54, the ECU 34 selects a reference extraction area Rref as a reference value (e.g., a default value) of the extraction area Rsb and sets the reference extraction area Rref as the extraction area Rsb to be used later.

According to the modification illustrated in FIG. 8, as in the above embodiment, the multiple-image regions 112 are provided in addition to the peripheral-image-only region 110 (FIGS. 9A and 9B). Accordingly, by displaying the different image Ia simultaneously with the peripheral image Isr of the vehicle 10, it is possible to increase the driver's convenience regarding the use of the peripheral image Isr of the vehicle 10.

In addition, according to the modification, if the traveling lane 150 or the following vehicle 180 (predetermined target) is present within the peripheral image Isr corresponding to the peripheral-image-only region 110 (YES in S51 in FIG. 8), the position of the peripheral-image-only region 110 on the display screens 100 and 102 is changed in such a manner that the change in the position of the traveling lane 150 or the following vehicle 180 in the width direction is suppressed (S53).

Accordingly, even if the subject vehicle 10, the traveling lane 150, or the following vehicle 180 is shaky in the width direction, the change in the position of the traveling lane 150 or the following vehicle 180 on the display screens 100 and 102 is small. Accordingly, it is possible to reduce the driver's cognitive load on the traveling lane 150 or the following vehicle 180. In addition, it is possible to reduce the feeling of strangeness or cognitive load that the driver has if the display area of the peripheral image Isr is changed in response to starting or ending displaying the different image Ia.

Furthermore, according to the modification, if the subject vehicle 10 or the following vehicle 180 is changing lanes (NO in S52 in FIG. 8), the suppression of the change in the position of the following vehicle 180 or the traveling lane 150 in the width direction is stopped (S54). Accordingly, at the time the subject vehicle 10 or the following vehicle 180 changes lanes, the peripheral image Isr in accordance with the lane changing can be displayed.

What is claimed is:

1. An image display device comprising:
a display having a display screen for displaying an image captured by a camera and a different image that is different from the captured image; and
an image controller configured to cause the display to display image captured by the camera and the different image on the display screen,
wherein the image controller provides, on the display screen of the display,
a captured-image-only region in which only the captured image is displayed when the display displays the captured image, and
a multiple-image region in which an extended image continuous from the captured image or the different image is selectively displayed when the display displays the captured image, and
wherein the image controller is configured to,
when causing the different image to be displayed in the multiple-image region in a state where the extended image continuous from the captured image is displayed in the multiple-image region, fix a position of the captured-image-only region on the display screen and cause the different image to fade in while decreasing a display area of the extended image in the multiple-image region, or
when ending displaying the different image in a state where the different image is displayed in the multiple-image region, fix the position of the captured-image-only region on the display screen and cause the different image to fade out from the multiple-image region while increasing the display area of the extended image, and wherein the image controller is further configured to, when it is detected that a caution-target object is present within the extended image corresponding to the multiple-image region in a state where the different image is displayed in the multiple-image region, the caution-target object being an object for which a user has to heed caution, cause the display to display a notification about the presence of the caution-target object at a position between the captured-image-only region and the multiple-image region, while causing the different image to fade out from the multiple-image region.

2. The image display device according to claim 1, wherein, when the different image is switched to the extended image in response to the predetermined operation performed by the user after starting displaying the notification, the image controller displays the caution-target object in an emphasized manner in the captured image.

3. The image display device according to claim 1, wherein the display constitutes an electronic rear-view mirror of a vehicle, the electronic rear-view mirror being disposed in front of and above a user of the vehicle, wherein the captured image includes an image of a region behind the vehicle, and wherein, while the vehicle is traveling forward or is in drive mode, the image controller allows switching between the extended image and the different image in the multiple-image region and fixes the position of the captured-image-only region.

4. The image display device according to claim 1, wherein, when it is detected that a predetermined target is present within the captured image corresponding to the captured-image-only region, the image controller sets an extraction area of the captured image to be displayed on the captured-image-only region on the display screen in such a manner that a change in a position of the predetermined target in a lateral direction is suppressed.

* * * * *